United States Patent
DeSimone

(10) Patent No.: US 12,337,763 B2
(45) Date of Patent: Jun. 24, 2025

(54) VEHICLE CAMERA SYSTEM

(71) Applicant: Steve DeSimone, Hilton Head Island, SC (US)

(72) Inventor: Steve DeSimone, Hilton Head Island, SC (US)

( * ) Notice: Subject to any disclaimer, the term of this patent is extended or adjusted under 35 U.S.C. 154(b) by 84 days.

(21) Appl. No.: 18/192,152

(22) Filed: Mar. 29, 2023

(65) Prior Publication Data

US 2023/0311772 A1   Oct. 5, 2023

Related U.S. Application Data

(60) Provisional application No. 63/324,864, filed on Mar. 29, 2022.

(51) Int. Cl.
  B60R 1/26 (2022.01)
  H04N 23/45 (2023.01)
  H04N 23/57 (2023.01)

(52) U.S. Cl.
  CPC ............ B60R 1/26 (2022.01); H04N 23/45 (2023.01); H04N 23/57 (2023.01); *B60R 2300/105* (2013.01); *B60R 2300/40* (2013.01)

(58) Field of Classification Search
  CPC ........ H04N 23/50; H04N 23/57; H04N 23/45; B60R 1/26; B60R 2300/105; B60R 2300/40
  See application file for complete search history.

(56) References Cited

U.S. PATENT DOCUMENTS

| | | | |
|---|---|---|---|
| 5,640,627 A * | 6/1997 | Nakano | G03B 5/00 396/296 |
| 9,878,652 B2 | 1/2018 | DeSimone | |
| 10,518,687 B2 | 12/2019 | DeSimone | |
| 10,621,445 B2 | 4/2020 | Higgins | |
| 10,668,848 B2 | 6/2020 | DeSimone | |
| 11,242,097 B1 * | 2/2022 | Gross, IV | H04R 5/02 |
| 11,286,009 B2 | 3/2022 | DeSimone | |
| 2004/0017506 A1 * | 1/2004 | Livingston | G03B 17/18 348/222.1 |
| 2015/0183380 A1 | 7/2015 | Da Deppo et al. | |
| 2017/0163939 A1 | 6/2017 | Thompson et al. | |
| 2018/0001820 A1 * | 1/2018 | Higgins | B62D 33/0273 |
| 2018/0086283 A1 | 3/2018 | Green | |
| 2018/0220081 A1 | 8/2018 | Lewis et al. | |
| 2019/0118729 A1 | 4/2019 | Hartland | |
| 2019/0329718 A1 * | 10/2019 | Kanaya | B60D 1/36 |
| 2022/0141423 A1 * | 5/2022 | Schondorf | H04N 7/181 701/300 |
| 2022/0212603 A1 * | 7/2022 | Castro | B62D 33/0273 |

FOREIGN PATENT DOCUMENTS

WO   2020232346 A1   11/2020

* cited by examiner

*Primary Examiner* — Daniel M Pasiewicz
(74) *Attorney, Agent, or Firm* — Young Basile Hanlon & MacFarlane, P.C.

(57) ABSTRACT

A camera system for a vehicle comprising: (a) a rear camera configured to be secured to an outer surface of a tailgate of the vehicle to provide imaging of a rear area behind the vehicle when the tailgate is in a closed position; (b) an alternate camera configured to be secured to the vehicle to provide imaging of the rear area of the vehicle when the tailgate is in an open position; and (c) a tilt switch configured to determine a position of the tailgate and signal to activate the rear camera or the alternate camera based on the position of the tailgate.

20 Claims, 4 Drawing Sheets

VEHICLE CAMERA SYSTEM

FIELD

CROSS-REFERENCE TO RELATED APPLICATION(S)

This application claims priority to U.S. Provisional Patent Application No. 63/324,864, filed Mar. 29, 2022, the entire disclosures of which are hereby incorporated by reference.

The present teachings generally relate to a vehicle system, and more particularly, to a vehicle camera system for a movable tailgate.

BACKGROUND

Rear-view cameras on vehicles may often be required in various markets, both in the U.S. and abroad. A rear-view camera may often be mounted to a rear portion of a vehicle, such as a trunk, hatch, or tailgate of various vehicles to provide a user a field of view behind the vehicle. As a result, a rear-view camera may convey a live video of a region behind the vehicle to a driver within the vehicle, thereby providing the driver a clearer view of the surrounding area to ensure safety while driving. For example, a driver may utilize the rear-view camera when driving in reverse to help ensure no objects or persons near the vehicle are impacted.

Additionally, many rear-view cameras may also be in communication with one or more vehicle electronics to collect information that may be used in various safety and/or assistance systems of the vehicle. These systems may include, but are not limited to, vehicle backing assist systems, parking assist systems, trailer towing assist systems, other active safety and/or passive safety systems, or a combination thereof.

On pick-up trucks in particular, the rear-view camera may be mounted directly to a rear portion of the tailgate to provide an optimal viewing field for a driver. However, given the positioning of the camera, a driver may be unable to utilize the camera view if the tailgate is in an open or extended position. For example, if the tailgate is open or extended to carry larger objects or loads, the camera may no longer see a rear area surrounding the truck. Instead, the camera may be positioned directly at the ground beneath or near a rear bumper of the truck. As a result, a driver may no longer have the additional viewing aid when driving the truck with the tailgate open or extend. Unfortunately, such a lack of safety provided by the rear-view camera in these particular instances may result in injury or damage to the truck, one or more objects or persons around the truck, or a combination thereof.

Therefore, based on the above, there remains a need for a camera system that accommodates driving with the tailgate in an open or extended position. What is needed is a camera system that provides an alternative view of the rear of the vehicle when the tailgate is open or extended. Additionally, there remains a need for a camera system that automatically determines a position of the tailgate. What is needed is a camera system that conveys a different camera view based upon determination of the tailgate position. Moreover, there remains a need for a camera system that may easily be integrated into original equipment manufacturer (OEM) tailgates. What is needed is a camera system that may be installed into OEM or aftermarket tailgates free of significant modification and/or fabrication, thereby allowing for retrofit of existing tailgates or installation into newly manufactured tailgates.

SUMMARY

The present teachings meet one or more of the present needs by providing a camera system for a vehicle comprising: (a) a rear camera secured to an outer surface of a tailgate of the vehicle to provide imaging of a rear area behind the vehicle when the tailgate is in a closed position; (b) an alternate camera secured along a top edge of the tailgate to provide imaging of the rear area of the vehicle when the tailgate is in an open position; and (c) one or more mercury switches to determine a position of the tailgate and activate the first camera or the second camera based on the position of the tailgate.

The one or more mercury switches may include a first mercury switch in electrical communication with the rear camera and a second mercury switch in electrical communication with the alternate camera. The first mercury switch and the second mercury switch may be positioned within the tailgate of the vehicle. The first mercury switch and the second mercury switch may be positioned in opposing directions such that activation of the first mercury switch occurs when the second mercury switch is inactive, and vice versa. Activation of the first mercury switch may allow imaging from the rear camera to be conveyed to an inner display of the vehicle. Activation of the second mercury switch may allow imaging from the alternate camera to be conveyed to the inner display of the vehicle. Additionally, the first mercury switch and the second mercury switch may be positioned at an angle of about 45 degrees relative to the ground.

Moreover, imaging from only the rear camera or the alternate camera may be conveyed to the inner display of the vehicle at one time. The rear camera and the alternate camera may each have a dedicated external power source. A power wire may extend from the rear camera and may be received by an input of the first mercury switch and a power wire may extend from the alternate camera and may be received by an input of the second mercury switch. An output power wire of the first mercury switch may be connected to an output power wire of the second mercury switch at a common wire connection point, thereby allowing for a shared, single output power wire of the common wire connection point. Video wiring of the rear camera, video wiring of the alternate camera, and the single output power wire may converge into a wire harness of the camera system. The wire harness may be adapted to connect the video wiring of the rear camera, the video wiring of the alternate camera, and the single output power wire to a main connector. Similarly, the main connector may be connected to a vehicle connection point to integrate the camera system with an overall vehicle system. Moreover, the rear camera, the alternate camera, or both may be connected to the video wiring by a camera connector, such as a quick connector. The rear camera and the alternate camera may include ground wires that are also connected to the main connector.

Additionally, the camera system may be adapted for installation in an original equipment manufacturer (OEM) vehicle. Installation of the camera system may be completed during assembly of the vehicle. Installation of the camera system may be completed as a retrofit of the vehicle. The vehicle may be a pickup truck.

The present teachings may meet one or more of the present needs by providing: a camera system that accommodates driving with the tailgate in an open or extended position; a camera system that provides an alternative view of the rear of the vehicle when the tailgate is open or extended; a camera system that automatically determines a position of the tailgate; a camera system that conveys a different camera view based upon determination of the tailgate position; a camera system that may easily be integrated into original equipment manufacturer (OEM) tailgates; a camera system that may be installed into OEM or aftermarket tailgates free of significant modification and/or fabrication, thereby allowing for retrofit of existing tailgates or installation into newly manufactured tailgates; or a combination thereof.

DETAILED DESCRIPTION

Figure 1:
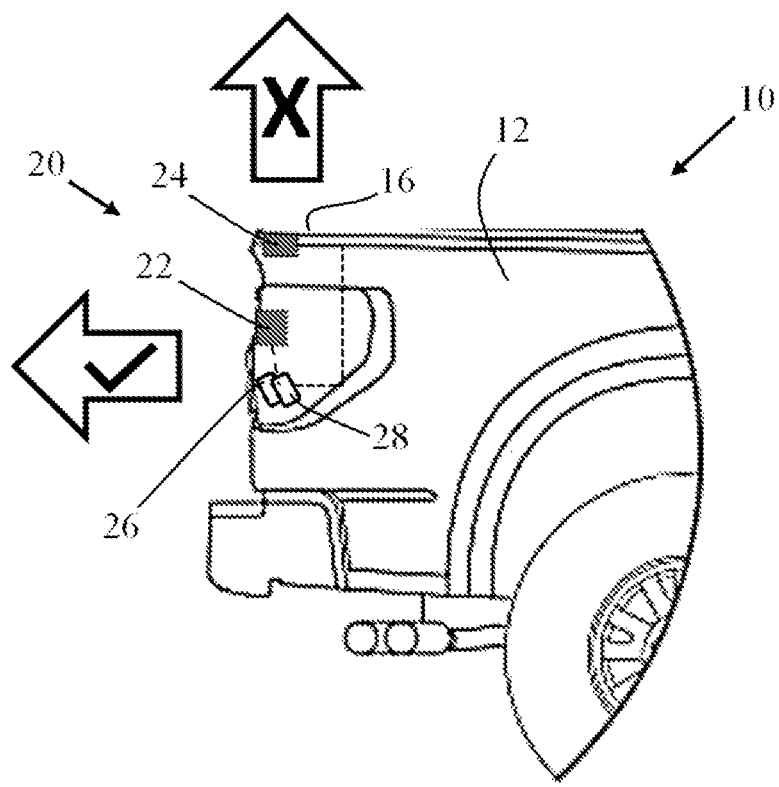
FIG. 1 is a side view of a tailgate in a closed position and having a camera system in accordance with the present teachings.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference in their entirety for all purposes. Other combinations are also possible as will be gleaned from the following claims, which are also hereby incorporated by reference in their entirety into this written description.

The present teachings generally relate to a vehicle and a system for a vehicle. The vehicle may be any type of automobile, such as a car, truck, sports utility vehicle (SUV), commercial vehicle, or a combination thereof. The vehicle may include a system integrating one or more accessories into the vehicle. The accessories may be part of the vehicle by the Original Equipment Manufacturer (OEM), may be provided as a secondary aftermarket accessory, or a combination thereof. Examples of secondary accessories may include, but are not limited to, one or more electronic monitoring systems (e.g., active safety systems, passive safety systems, or both), one or more camera systems, one or more lights, one or more doors, one or more interior accessories, one or more exterior accessories, or a combination thereof.

The aforementioned vehicle system may integrate one or more components located near or along a cargo box of a vehicle. The cargo box may be defined as a storage portion of the vehicle located adjacent to a cabin of the vehicle. One particular example may include a pickup truck having a cargo box attached to a rear of a vehicle cab. The cargo box may be partially enclosed, fully enclosed, or both. That is, the cargo box may include one or more openings, one or more doors, or a combination thereof.

The cargo box may include a tailgate. The tailgate may function to at least partially enclose the cargo box, such as a rearmost portion of the cargo box. The tailgate may be an access point into the cargo box. The tailgate may be considered an accessory of the cargo box. The tailgate may be moveable between an open position and a closed position. The open position may be when the tailgate is substantially parallel to the ground and provides an open access point into the cargo box (i.e., an extended position). However, the open position may also include one or more additional intermediate positioned between the tailgate being substantially parallel to the ground and a closed position (i.e., a partially open or extended position). The closed position may be when the tailgate is substantially perpendicular to the ground and substantially enclosed at least a portion of the cargo box.

As stated above, the tailgate may also move and/or be secured in one or more positions between the open position and the closed position, beyond the open position (i.e., opening beyond being substantially parallel to the ground), or a combination thereof. The tailgate may be manually operated by a user or may be actuated by one or more powered actuators. The tailgate may include a manual and/or automatic latching or locking device. That is, the tailgate may be operated physically by a user or may be actuated remotely. Moreover, the tailgate may include one or more accessories, such as one or more loading ramps, one or more extensions, one or more additional accessories, or a combination thereof. As such, it is envisioned that the teachings herein may relate generally to an OEM installed or aftermarket tailgate. Examples of tailgates in which the system described herein may be installed include, but are not limited to, those found in U.S. Pat. Nos. 9,878,652; 10,518,687; 10,668,848; and 11,286,009, all of which are incorporated herein in their entireties for all purposes.

The teachings herein may pertain to a camera system for a vehicle as discussed above. That is, it is envisioned that the camera system as described herein may be particularly beneficial for vehicles having a tailgate, such as a pickup truck. However, the camera system may also be advantageous in other vehicles, such as those with a hatch or moveable trunk door requiring various camera positioned depending on cargo being carried within the vehicle.

The camera system may function to provide a driver within the vehicle a visual of a surrounding area of the vehicle. The camera system may provide a visual of a rear surrounding area of the vehicle. A rear area around the vehicle may be an area near or proximate to the tailgate or cargo box of the vehicle, an area extending behind the vehicle or both. However, in certain instances, the camera system may also provide a visual of an area partially beneath the vehicle, on one or more sides of the vehicle, in front of the vehicle, or a combination thereof. As such, it should be noted that the camera system may be adaptable to various configurations within the vehicle.

The camera system may be installed into a vehicle as an OEM part such that the camera system is installed into the vehicle during assembly of the vehicle. However, advantageously, the camera system may also be installed into the vehicle after assembly of the vehicle (e.g., an aftermarket part). Beneficially, the camera system may be integrated into a vehicle system such that a secondary monitor or screen within the vehicle is not necessary. As such, the camera system, once installed, may be connected directly to existing wiring within the vehicle to easily connect the camera system directly or indirectly to a user interface (e.g., screen, monitor, display, etc.) within the vehicle, thereby allowing a driver or other occupant to use the existing electronics of vehicle in conjunction with the camera system. It should be noted that the camera system may utilize any existing display devices within the vehicle that may be configured for a conventional backup camera. That is, the conventional backup camera may be replaced by the camera system taught herein and integrated into the existing display configuration.

The camera system may include a rear camera. The rear camera may function as a primary rear camera for the vehicle when the tailgate (or hatch) of the vehicle is in a closed position. That is, when the tailgate is not in an open position, the rear camera may be utilized to provide a user a visual of a rear surrounding area of the vehicle.

The rear camera may be positioned anywhere along the rear of the vehicle such that a visual of the rear surrounding area may be captured. However, it is envisioned that the rear camera may be located along an outer surface of the tailgate to provide an accurate visual of the rear surroundings. The rear camera may be secured within the outer surface of the tailgate to provide a visual of the surrounding area in an unobstructed manner. That is, when the tailgate is in a closed position, the rear camera may accurately capture a visual of the rear area surrounding the vehicle. Such a visual may be relayed to a display within the vehicle to provide a live feed of the surrounding area. The feed from the rear camera may be transmitted to the display based upon a trigger from the vehicle, such as shifting the vehicle transmission into reverse, pressing a button to access the rear camera feed, during towing of a secondary trailer, other trigger, or a combination thereof.

Unfortunately, the rear camera similar to a conventional vehicle camera may be unable to provide a view of the rear surrounding area of the vehicle when the tailgate is open. That is, when the tailgate is open, the camera may be facing the ground near or beneath the vehicle, thereby obstructed a view of the rear of the vehicle. To cure such a deficiency, the camera system herein may advantageously provide an alternate camera.

The alternate camera may function to provide a driver or occupant of the vehicle a visual of the rear surrounding area of the vehicle when the tailgate is in an open position. That is, the alternate camera may provide a visual of the rear surrounding area of the vehicle when the rear camera is unable to provide an accurate visual due to opening of the tailgate. However, the alternate camera may also be activated based upon a trigger within the vehicle, such a button, switch, etc.

The alternate camera may be positioned in a manner that allows for an accurate visual of a rear surrounding area of the vehicle when the tailgate is in an open position. For example, the alternate camera may be located along a top edge of the tailgate so that, when the tailgate is open, the alternate camera may be positioned substantially parallel to the ground. As such, the alternate camera may be positioned substantially perpendicular to the rear camera along the tailgate. However, it should be noted that the alternate camera may also be positioned in another location along the vehicle other than a top edge of the tailgate. For example, the alternate camera may be located along the cargo box of the vehicle, near or adjacent to a taillight of the vehicle, on the rear bumper of the vehicle, on the trailer hitch of the vehicle, on a license plate holder of the vehicle, or a combination thereof. Thus, it may be gleaned from the present teachings that the camera system as described herein may provide for various configurations as required based upon various vehicle applications.

The rear camera and the alternate camera may be similar cameras or may be different cameras. However, the teachings herein are not limited to any particular type of camera and are intended for use with various cameras. As such, the cameras may be any desired size and/or shape based upon a given vehicle, may include one or more secondary features (e.g., infrared, night filtering for visibility at night, secondary sensors, etc.). Thus, the cameras used within the camera system may be conventional OEM cameras, secondary aftermarket cameras, or both.

Once installed, the camera system may automatically determine whether a feed from the rear camera or a feed from the alternate camera should be displayed within the vehicle for a driver or occupant. For example, the camera system may automatically switch between displaying a feed from the rear camera and a feed from the alternate camera. However, in certain circumstances, the camera system may also provide the ability to view a feed from both cameras simultaneously, may allow for a user or driver to manually select which camera feed to display, or both. Yet it is envisioned that the camera system may particularly be suited for automatically determining whether a tailgate of the vehicle is in the open or closed position. When the vehicle is in the open position, the alternate camera feed may be displayed within the vehicle. Conversely, when the tailgate is in the closed position, the rear camera feed may be displayed within the vehicle.

The camera system may determine a position of the tailgate based upon one or more mercury switches. The mercury switches may function to automatically transmit and/or shut off transmission of a feed from the rear camera, the alternate camera, or both to a display within the vehicle. To do so, the mercury switches may be positioned within or on the tailgate so that the mercury switches articulate based upon movement of the tailgate. That is, as the tailgate is opened and/or closed, the switches open and close a circuit within the switch, thereby allowing or preventing transmission from the rear camera or the alternate camera to the display within the vehicle.

A single mercury switch may be used within the camera system to alternate feeds from the rear camera and the alternate camera. However, it is particularly envisioned that opposing mercury switches may be implemented to more accurately determine a position of the vehicle. The opposing switches may be located adjacent to each other in an opposing manner so that when one mercury switch is in an "on" position (i.e., the circuit is open within the switch), the other mercury switch is in an "off" position (i.e., the circuit is closed within the switch). In utilizing a dual mercury switch configuration, the rear camera and the alternate camera may have a dedicated mercury switch, yet the rear camera and the alternate camera may still work in conjunction based upon movement of the tailgate. Configurations of the mercury switches within the camera system are described in further detail below. However, it should be noted that one or more additional switches may be utilized in lieu of a mercury switch, such as a unidirectional tilt switch, omnidirectional tilt switch, other power switches free of mercury, or a combination thereof. As such, the teachings herein may not be limited to a mercury switch.

As discussed above, the opposing mercury switches may be located within or on the tailgate. The opposing mercury switches may be positioned at a desired angle relative to the ground beneath the vehicle. The opposing mercury switches may be positioned at about 15 degrees or more, about 30 degrees or more, or about 45 degrees or more relative to the ground. The opposing mercury switches may be positioned at about 90 degrees or less, about 75 degrees or less, or about 60 degrees or less relative to the ground.

While mercury switches have been discussed in detail above, any positioning or tilt switch may be utilized within the camera system. For example, any switch that may determine when the tailgate is in an open or closed position may sufficiently signal which camera should be activated. By way of example, a physical tilt switch such as a mercury switch, an analogue tilt switch, or a digital tilt switch may be incorporated into the camera system depending on the vehicle configuration.

The camera system may utilize one or more wires to connect the rear camera and/or the alternate camera to each other, to the vehicle system, to one or more secondary devices, or a combination thereof. For example, the rear camera and the alternate camera may have a shared or dedicated power sources to power the cameras. The rear camera and the alternate camera may include power wiring to connect the cameras to the power source (e.g., vehicle battery, secondary battery, etc.). Wiring may include, but is not limited to, video wiring (e.g., video positive and/or video negative wires to provide a video feed to the display within the vehicle), ground wiring, power wiring, secondary wiring (e.g., wiring that connects the rear camera and/or the alternate camera to a secondary device such as power locks of the tailgate, wireless control sensors of the vehicle, an active and/or passive safety system of the vehicle, or a combination thereof).

Additionally, the rear camera and the alternate camera may include common wiring or common connection points for the camera wiring to provide shared output and/or input into the rear camera and the alternate camera. To create such connection points, the camera system may include one or more common wire connection points that utilize a quick or fast connector (e.g., plug, multi-pin connector, etc.) to merge various wires together. Such a system may also be utilized to provide a main convergence of camera system wiring before connecting to a vehicle connection point. The vehicle connection point may be any access point where the camera system may be connected to the overall vehicle system. Thus, it may be gleaned from the present teachings that the rear camera and the alternate camera may work in conjunction with one another yet may include dedicated wiring separate from each other.

Turning now to the figures, FIG. 1 illustrates a side view of a vehicle 10, and in particular, a pick-up truck having a cargo box 12 as a rear of the vehicle 10. The cargo box 12 may also include a tailgate 14 adapted to move been an open position and a closed position, including one or more positions therebetween (see FIG. 2).

The vehicle 10 may include a camera system 20 adapted to provide one or more images based upon a rear region surrounding the vehicle 10. The camera system 20 may thus visually monitor a rear region of the vehicle 10 and convey such a view to a driver or other occupant within the vehicle 10. That is, the camera system 20 may provide a driver or other occupant located within a cab of the vehicle 10 a live feed of the rear of the vehicle 10 by transmitting the images from the camera system 20 to a screen within the cab of the vehicle 10. However, it should also be noted that the camera system 10 may provide imaging in any desired manner to reach the drive and/or occupants of the vehicle 10.

To provide such imaging, the camera system 20 may include a rear camera 22 and an alternate camera 24. While both the rear camera 22 and the alternate camera 24 may provide imaging simultaneously, it is envisioned that the rear camera 22 and the alternate camera 24 may provide imaging alternatingly based upon a position of the tailgate 14 of the vehicle, as further described below. As a result, the camera system 20 may beneficially provide one or more camera positions to maintain a clear view of the surrounding region of the vehicle 10 even during movement of the tailgate 14.

As shown in FIG. 1, the tailgate 14 is in a closed position, whereby the tailgate 14 encloses an opening at the rear of the cargo box 12 to ensure a position of cargo therein. In such a closed position, the rear camera 22 mounted to or positioned along an exterior panel of the tailgate 14 may monitor or provide imaging of the surrounding area to the driver or occupant, as indicated by the arrow with a checkmark therein. Conversely, due to the tailgate 14 being in the closed position, the alternate camera 24 located along a top edge 16 of the tailgate 14 may be turned off or otherwise not broadcast an image to the driver and/or occupant, as indicated by the arrow with an "X" therein.

Advantageously, the camera system 20 may determine a position of the tailgate based upon a first mercury switch 26 and a second mercury switch 28 positioned or otherwise secured within the tailgate 14. It is envisioned that the mercury switches 26, 28 may be placed in an opposing manner to ensure proper operation of the rear camera 22 and the alternate camera 24. For example, the first mercury switch 26 may be in electrical communication with the rear camera 22 while the second mercury switch 28 may be in electrical communication with the alternate camera 24. It should be noted that the first mercury switch 26 and the second mercury switch 28 may also be electrically connected. Due to such connection and opposing positions of the mercury switches 26, 28, the first mercury switch 26 may be in an activated position while the second mercury switch 28 is in an inactive position, or vice versa. An activated position may result in the associated camera 22, 24 being turned on while an inactive position may result in the associated camera 22, 24 being turned off. As a result, the dual mercury switches 26, 28 may ensure that only the rear camera 22 or the alternate camera 24 is turned on at a given time. For example, as shown in FIG. 1, when the tailgate 14 is in the closed position, the first mercury switch 26 may activate the rear camera 22 while the second mercury switch 28 may be switched to an inactive state, thereby ensuring that the alternate camera 24 is not turned on.

Figure 2:
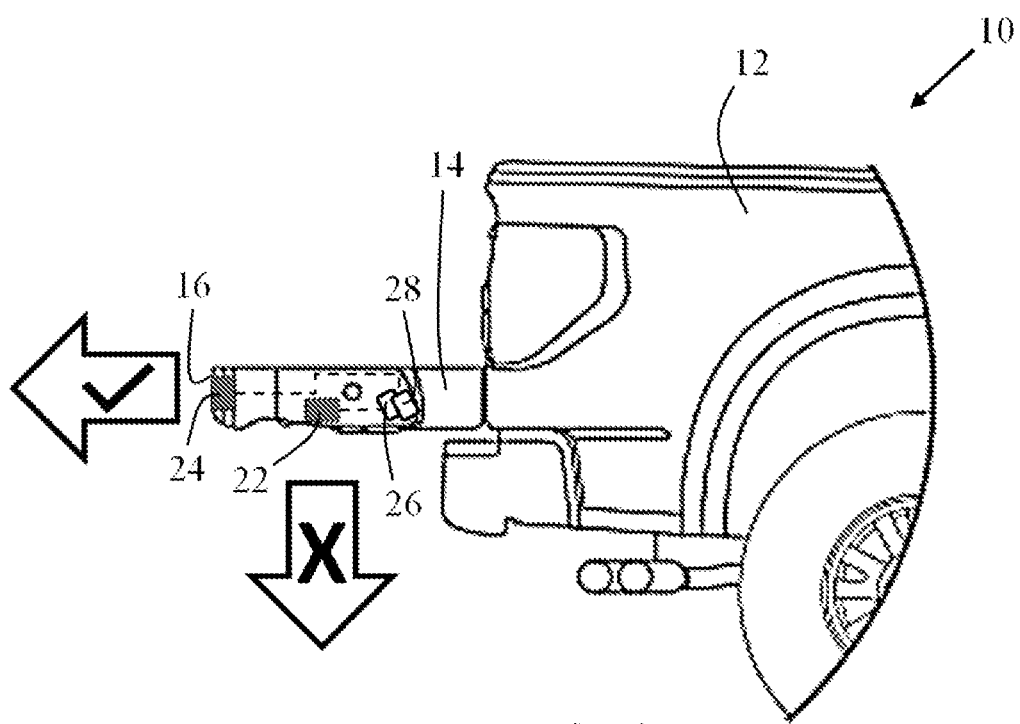
FIG. 2 is a side view of the tailgate of FIG. 1 in an open position.

FIG. 2 illustrates the vehicle 10 shown in FIG. 1 with the tailgate 14 in an open position. The open position may be defined as an extended position of the tailgate 14 whereby the tailgate no longer enclosed an opening of the cargo box 12. Such a position may be utilized to carry oversized cargo that extends beyond the confines of the cargo box 12. In such a situation, the rear camera 22 may be positioned downward toward the ground beneath or near the rear of the vehicle 10. As a result, the rear camera 22 may unfortunately not provide an adequate visual of the surrounding area of the vehicle 10. Thus, it may be gleaned from the present teachings a disadvantage of conventional tailgate cameras.

To solve such a problem, the camera system 20 may also include an alternate camera 24 located along a top edge 16 of the tailgate 14. The alternate camera 24 may beneficially provide an alternate view of the surrounding area of the vehicle 10 when the tailgate 14 is in the open position. As discussed above with respect to FIG. 1, the first mercury switch 26 and the second mercury switch 28 may be determine a position of the tailgate 14 to dictate when the rear camera 22 and the alternate camera 24 are turned on and/or off. For example, when the tailgate 14 is in the closed position (see FIG. 1), the first mercury switch 26 may turn on the rear camera 22 while the second mercury switch 28 may turn off the alternate camera 24.

Conversely, when the tailgate 14 is in the open position, the first mercury switch 26 may turn off the rear camera 22 facing the ground, as indicated by the arrow with an "X" therein. Additionally, the second mercury switch 28 may turn on the alternate camera 24, as indicated by the arrow with a checkmark therein. As a result, even though the rear camera 22 may no longer provide an adequate or unobstructed view of the surrounding area when the tailgate 14 is in the closed position, the alternate camera 24 may beneficially be activated to still provide an unobstructed view of the surrounding area. That is, the alternate camera 24 when the tailgate 14 is in the open position may provide a similar view to the view provided by the rear camera 22 in when the tailgate is in the closed position.

Figure 3:
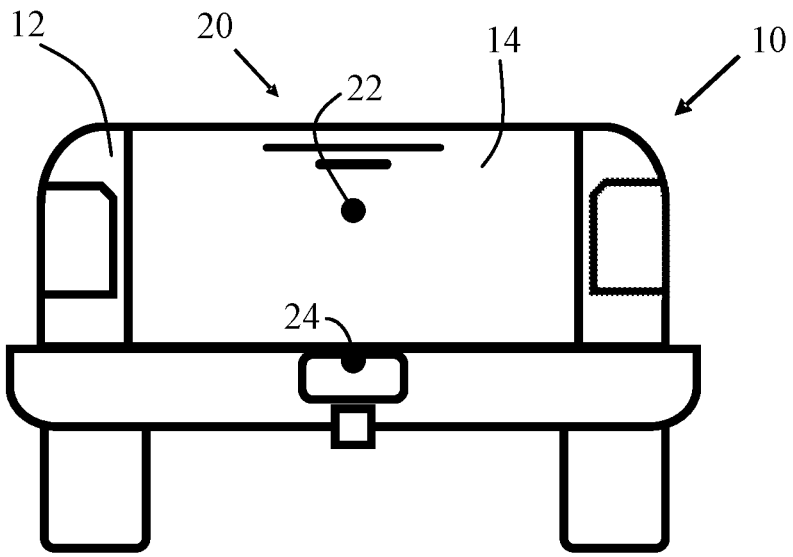
FIG. 3 is a rear view of a camera system in accordance with the present teachings.

FIG. 3 illustrates a rear view of a camera system 20 in accordance with the present teachings. The camera system 20 may be adapted as a rear-view camera system for a vehicle 10, such as a truck having a cargo box 12 and a rear tailgate 14. As discussed above, the camera system 20 may include a rear camera 22 positioned along an outer surface of the tailgate 14. The rear camera 22 may be activated or provide a view of the surrounding area of the vehicle when the tailgate 14 is in a closed position as shown. However, it should be noted that the rear camera 22 may also be controllable to activate in one or more additional positions or during particular times. For example, while the rear camera 22 may typically be utilized when the vehicle 10 is moving in reverse, the rear camera 22 may also be activatable while driving in a forward direction, such as when towing one or more items.

The rear camera 22 may be secured anywhere along the tailgate 14. For example, the rear camera 22 may be located along the tailgate 14 in various positions based upon a particular vehicle 10 and/or tailgate 14 design (e.g., geometry, contour, shape, etc.). Similarly, while the rear camera 22 is shown mounted to the tailgate 14, it is envisioned that in certain circumstances the rear camera 22 may be located alternatively along the cargo box 12, such as near one of the taillights or along a surface of the rear bumper. As such, it should be noted that the camera system 20 may be beneficially adapted for a number of different vehicles 10.

The camera system 20 may also include an alternate camera 24. The alternate camera 24 may beneficially provide an alternate image when compared to the rear camera 22 depending on the position of the tailgate 14. For example, when the tailgate 14 is in an open position, the rear camera 22 may be pointed directly at the ground and provide no view of a rear region surrounding the back of the vehicle. As a result, the camera system 20 may identify such an open position of the tailgate 14 and automatically switch to displaying an image from the alternate camera 24. To ensure that the alternate camera 24 is not obstructed when the tailgate is in the open position, the alternate camera 24 may be located along a portion of the vehicle that would not be pointing towards the ground. For example, the alternate camera 24 as shown may be positioned on or near a license plate holder of the vehicle located on a rear bumper of the vehicle. As the rear bumper would remain in the same position regardless of the tailgate being open or closed, the alternate camera 24 would always be directed to display a rear region behind the vehicle.

Figure 4:
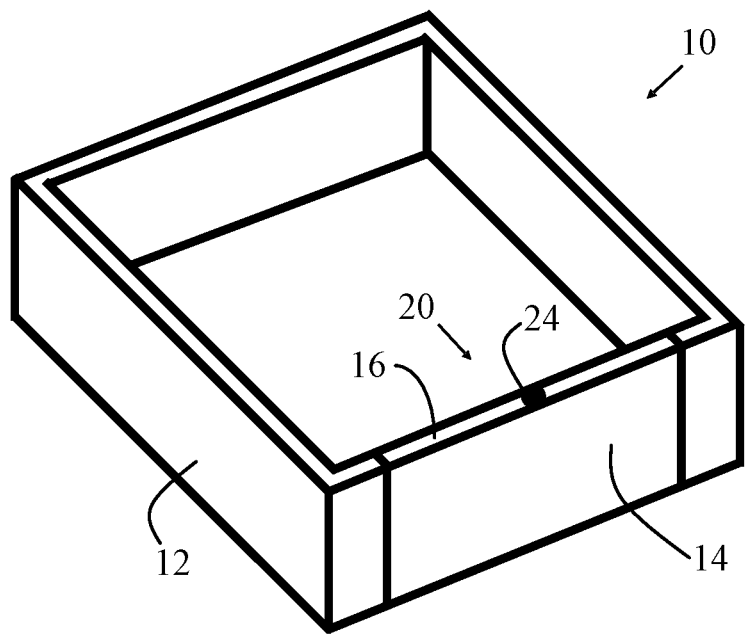
FIG. 4 is a perspective view of a top edge of a tailgate having a camera system in accordance with the present teachings.

FIG. 4 illustrates a perspective of a tailgate 14 of a vehicle 10. As discussed above, the vehicle 10 may include a camera system 20 having a rear camera (see FIG. 3) and an alternate camera 24. The alternate camera 24 may be located along a top edge 16 of the tailgate 14 so that, when the tailgate 14 is in an open position, the alternate camera 14 may provide an image of the rear surrounding area of the vehicle 10. Such imaging may be dictated by one or more mercury switches as discussed in further detail above.

The alternate camera 24 may be secure to an outer surface of the top edge 16 or may be positioned within a hole formed therein. As a result, the alternate camera 24 may protrude from the top edge 16 or may be substantially flush with the top edge 16 to form a substantially smooth surface. Similarly, the alternate camera 24 may be sealed to ensure moisture and/or debris does not enter the hole formed within the top edge 16. It should also be noted that such mounting techniques may utilized to secure the rear camera as well. However, given different positioning between the cameras, different mounting techniques may also be used for each camera.

As may be gleaned from the present teachings, the alternate camera 24 may be positioned in various positions along the vehicle in different configurations. For example, as discussed with respect to FIG. 3, the alternate camera 24 may be located on or near a license plate holder of the vehicle mounted to a rear bumper of the vehicle. While such positioning may beneficially provide a better image than one from the rear camera 22 when the tailgate 14 is in an open position, user may still desired a more spanning image of the rear of the vehicle. That is, the rear camera 22 is typically mounted in an ideal spot along the tailgate 14 to provide the most accurate image of a rear region behind the vehicle. To provide the most similar view to that of the rear camera 22 when the tailgate 14 is in the closed position, the alternate camera 24 may be located along the top edge 16 of the tailgate 14, thereby ensuring a similar vantage point for when the tailgate 14 is in the open position.

Figure 5:
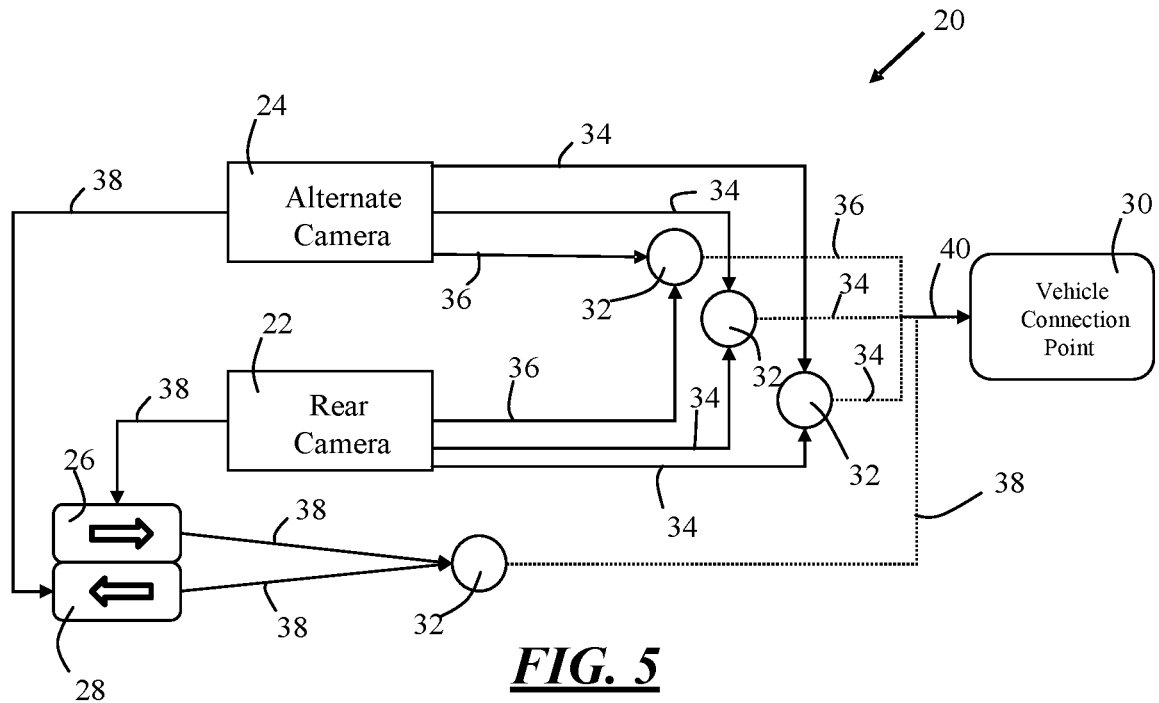
FIG. 5 is an electrical diagram of a camera system in accordance with the present teachings.

FIG. 5 illustrates an electrical diagram of the camera system 20 in accordance with the present teachings. For simplicity, secondary wiring and/or interconnected vehicle systems have been omitted. However, such interconnection with other vehicle systems may advantageously be possible to further integrate the camera system 20 within a vehicle.

The camera system 20 may include both a rear camera 22 and an alternate camera 24. The rear camera 22 and the alternate camera 24 may be in communication via one or more wires. As shown, the alternate camera 24 and the rear camera 22 may both include a set of wires that includes a pair of video wiring 34 (video positive (+) wire and video negative (−) wire) and a ground wire 36. The video wires 34 and the ground wire 36 from the alternate camera 24 and the rear camera 22 may connect to each other, respectively, at various common wire connection points 32. For example, the video positive wire 34 of the alternate camera 24 and the video positive wire 34 of the rear camera 22 may connect at a common wire connection point 32. The same may also be the case for the video negative wires 34 and/or the ground wires 36.

At each of the common wire connection points 32 discussed above, a video wire 34 or a ground wire 36 may extend and converge within a wire harness 40. The common wire harness 40 containing the plurality of wires may then connect and be in communication with a vehicle connection point 30. It is envisioned that the vehicle connection point 30 may be a connection point within the vehicle system to integrate the camera system 20 with the remaining vehicle system.

In addition to the video wiring for the cameras 22, 24 discussed above, the alternate camera 24 and the rear camera 22 may also each include an external and/or internal power source (not shown) to provide power to each camera 22, 24. It is envisioned that the alternate camera 24 and the rear camera 22 may each have their own independent power source. However, a shared power source may also be possible.

The power source for the rear camera 22 may also power or be in communication with a first mercury switch 26 via a power wire 38. Similarly, the power source for the alternate camera 24 may also power or be in communication with a second mercury switch 28 via a power wire 38. As discussed above, the mercury switches 26, 28 may be adapted to toggle power imaging provided by the rear camera 22 and the alternate camera 24. To facilitate such toggling or switching, the mercury switches 26, 28 may be positioned approximately 180 degrees relative to each other (i.e., in opposite directions), as indicated by the arrows within the mercury switches 26, 28. As a result, when one mercury switch is moved to an active or "on" position, the opposing mercury switch may be in an inactive or "off" position. Thus, a feed from only the alternate camera 24 or the rear camera 22 may be conveyed through camera system 20 into the vehicle.

It may also be noted that the power wires 38 extending from the cameras 22, 24 to their respective mercury switches 26, 28 may be separate and maintain independent connections such that operation of both cameras 24 may be independent. As such, the power wires 38 may connect to an input side of the mercury switches 26, 28 so that output power wires 38 may extend from an output side of the mercury switches 26, 28 and connect at a common wire connection point 32. At this point, a single power wire 38 may extend from the common wire connection point 32 to the wire harness 40 and into the vehicle connection point 30. Beneficially, since the video wiring 34, the ground wiring 36, and the power wiring 38 may all terminate in a common wire harness 40, a single connector may connect to the vehicle connection point 30. Similarly, since the output power wires 38 of the mercury switches 26, 28 may be tied together and run into the wire harness 40, the mercury switches 26, 28 may beneficially power switching between the alternate camera 24 and the rear camera 22 by toggling power between the alternate camera 24 and the rear camera 22. That is, the rear camera 22 may be powered on or receive power while the alternate camera 24 is powered off or not receive power, or vice versa.

Figure 6:
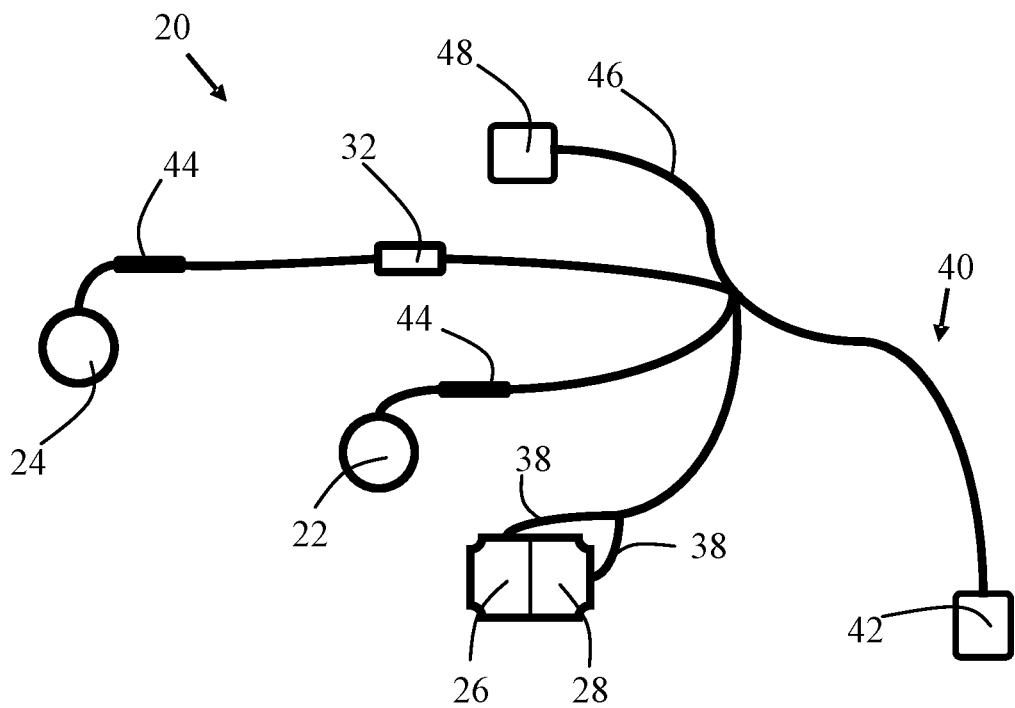
FIG. 6 is a schematic view of an uninstalled camera system in accordance with the present teachings that includes a rear camera and an alternate camera.

FIG. 6 illustrates a schematic view of an uninstalled camera system 20 for a vehicle. The camera system 20 includes a rear camera 22 and an alternate camera 24. The rear camera 22 and the alternate camera 24 may each be connected to wiring as described above (e.g., see FIG. 5) via a camera connector 44. The camera connector 44 may provide a quick-connect feature that facilitates easily connecting the wiring from the cameras 22, 24 to the wiring along the camera system 20. Additionally, as discussed above, power wires 38 extending from the cameras 22, 24 may be received by inputs on dedicated mercury switches 28, 30 (i.e., a first mercury switch 26 receiving the power wire 38 from the rear camera 22 and a second mercury switch 28 receiving the power wire 38 from the alternative camera 24. Moreover, as mentioned above, video wiring and power wiring extending from the mercury switches 28, 30 may converge into a wire harness 40. The wire harness 40 may facilitate all of the wiring of the camera system 20 being connected to a single main connector 42, though a plurality of main connectors 42 may be possible in certain applications as needed. Thus, a user may simply connect the main connector 42 of the camera system 20 into a vehicle connection point 30, thereby easily integrating the camera system 20 into the overall vehicle system.

It should also be noted that the camera system 20 may be integrated or otherwise connected to secondary wiring 46 of the vehicle system. For example, the camera system 20 may be in connection with, or located adjacent to, secondary wiring 46 that provides additional functionality of the vehicle. Such functionality may include one or more safety systems, wiring for locking and/or unlocking the tailgate of a vehicle, power supply to one or more taillights, other functionality, or a combination thereof. To integrate the camera system 20 into the secondary systems of the vehicle, the secondary wiring 46 may include a secondary connector 48 that may facilitate connection of the camera system 20 into the secondary systems.

It is envisioned that, while an exemplary camera system 20 has been illustrated with respect to wiring, wiring between vehicles may vary. As a result, the camera system 20 herein may include and/or exclude various wiring to accommodate various applications. Thus, the camera system 20 is not limited to any one particular wiring, and therefore advantageously may integrate into various vehicle systems. For example, the camera system 20 may be utilized with an existing vehicle rear-view camera to provide one or more alternative views of a vehicle's surrounding areas. Similarly, the camera system 20 may replace an existing rear-view camera of a vehicle to provide the benefits as described herein. Thus, it may be gleaned from the present teachings that the camera system 20 may be modified to utilize a rear camera 22 and an alternate camera 24 in communication with opposing mercury switches 26, 28 based on specific vehicle or user needs. Modifications may include changes to the wire harness 40, main connector 42, camera connectors 44, secondary wiring 46, vehicle connection point 30, common wire connection points 32, wiring itself (34, 36, 38), or a combination thereof to adapt the camera system 20 to a particular application while still providing the benefits described above.

Figure 7:
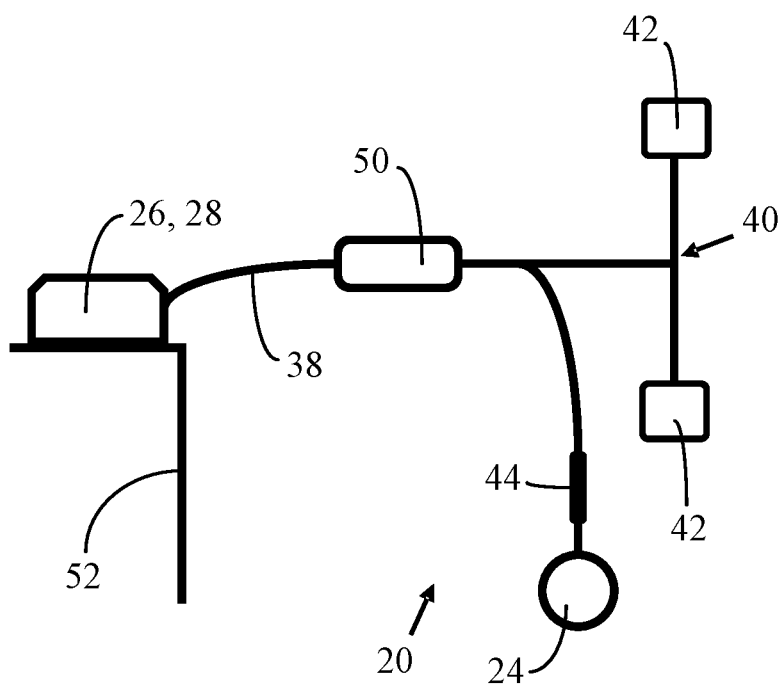
FIG. 7 is a schematic view of an uninstalled camera system in accordance with the present teachings that includes an alternate camera.

FIG. 7 illustrates a schematic view of an uninstalled camera system 20 for a vehicle. The camera system 20 illustrated in FIG. 7 may have a similar structure and/or wiring to that illustrated in FIG. 6. However, the camera system 20 shown in FIG. 7 may facilitate connection of a secondary camera 24 to existing wiring for a vehicle's rear camera. That is, a user may incorporate the camera system 20 shown in FIG. 7 be connecting the camera system 20 to an OEM-installed camera system conventionally found at the rear of a vehicle (e.g., rear of a tailgate of a vehicle). However, it should be noted that the camera system 20 of FIG. 7 could also be incorporated into a vehicle without an existing camera system to provide a single-camera wiring system.

The camera system 20 may include a wire harness 40. The wire harness 40 may provide a protective casing for one or more wires connecting various components of the camera system 20. For example, the wire harness 40 may protect camera wiring (e.g., audio and/or video wiring), power wiring 38 to power one or more components, other wiring, or a combination thereof. In certain cases, the wire harness 40 may be provide a more structurally rigid casing in localized areas of the camera system 20.

For example, the wire harness 40 may have an increase in thickness in a localized area that is configured to connect inline with existing wiring of a vehicle. The existing wiring may extend between a front region of the vehicle (e.g., a vehicle cab) to a rear region of the vehicle (e.g., a tailgate or cargo box of the vehicle). This type of wiring may often include a connector to connect the wiring in the rear region to the wiring in the front region. Often times, the wiring of the front region may include various vehicle systems, such as active and/or passive safety systems, lighting systems, power systems, etc. Similarly, the wiring of the rear region may include an OEM-installed rear camera wiring that can thereby be connected to the wiring of the front region to allow for an image from the rear camera to display within the vehicle cab, to signal the rear camera to activate when the vehicle is in one or more performance states, or both.

Advantageously, the camera system 20 described herein may be directly installed inline with the existing connection point between the wiring of the front region of the vehicle and the wiring of the rear region of the vehicle. As a result, the camera system 20 my communicate with the various vehicle systems (e.g., front region wiring) and the existing camera (e.g., rear region wiring). In doing so, a user may install an alternate camera 24 into the vehicle with fabrication or rewiring of existing vehicle systems.

To connect the camera system 20 inline with existing wiring, the camera system 20 may include one or multiple main connectors 42. In some configurations, the camera system 20 may include a single main connector 42 that may act as a junction between the wiring of the front region and the wiring of the rear region. However, as shown, a pair of main connectors 42 may provide such that a first of the main connectors 42 may be connected to a connector of the wiring of the front region and a second of the main connectors 42 may be connected to a connector of the wiring of the second region.

The alternate camera 24 may thus be to the vehicle wiring and rest of the camera system 20 by a camera connector 44. As a result, the alternate camera 24 may provide an alternate visual image in cases where the primary camera of the vehicle is obstructed or provides an insufficient visual of a rear of the vehicle. For example, a first mercury switch 26 and a second mercury switch 28 may be connected to the camera system 20 (e.g., a primary camera of the vehicle, the alternate camera 24, or both) by a mercury switch connector 50. The mercury switch connector 50 may allow for ease of installation of the mercury switches 26, 28 before connection to the remaining wiring of the camera system 20.

In certain configurations, the mercury switches, 26, 28 may be coupled to a bracket 52. The bracket may be any desired geometry to accommodate installing the mercury switches 26, 28 to a tailgate of the vehicle. For example, the bracket 52 may allow for mounting the mercury switches 26, 28 within a cavity or hollow portion of the tailgate in the proper orientation to ensure that the mercury switches 26, 28 identify when the tailgate is an open position or a closed position. After installation of the bracket 52, power wiring 38 and any other additional wiring of the mercury switches 26, 28 may be connected to the camera system 20 through the mercury switch connector 50. Advantageously, given the connection to the main vehicle system through the main connectors 42, the mercury switches 26, 28 may communicate or signal the main vehicle system to alternate between the main camera and the alternate camera 24 depending on a position of the tailgate (e.g., open or closed), thereby ensuring an accurate image or a rear region of the vehicle is displayed to a driver of the vehicle.

| ELEMENT LIST | |
|---|---|
| 10 | Vehicle |
| 12 | Cargo Box |
| 14 | Tailgate |
| 16 | Top Edge of the Tailgate |
| 20 | Camera System |
| 22 | Rear Camera |
| 24 | Alternate Camera |
| 26 | First Mercury Switch |
| 28 | Second Mercury Switch |
| 30 | Vehicle Connection Point |
| 32 | Common Wire Connection Point |
| 34 | Video Wiring |
| 36 | Ground Wiring |
| 38 | Power Wiring |
| 40 | Wire Harness |
| 42 | Main Connector |
| 44 | Camera Connector |
| 46 | Secondary Wiring |
| 48 | Secondary Connector |
| 50 | Mercury Switch Connector |
| 52 | Bracket |

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference herein in their entirety for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference herein in their entirety for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A camera system for a vehicle, comprising:
   (a) a rear camera configured to be secured to an outer surface of a tailgate of the vehicle to provide imaging of a rear area behind the vehicle when the tailgate is in a closed position;
   (b) an alternate camera configured to be secured to the vehicle to provide imaging of the rear area of the vehicle when the tailgate is in an open position; and
   (c) a tilt switch configured to determine a position of the tailgate and signal to activate the rear camera or the alternate camera based on the position of the tailgate, wherein the tilt switch includes:
      a first mercury switch in electrical communication with the rear camera, and
      a second mercury switch in electrical communication with the alternate camera, wherein wiring of the first mercury switch and wiring of the second mercury switch converge at a common wire connection point that is configured to electrically connect the camera system to a vehicle system of the vehicle.

2. The camera system of claim 1, wherein the first mercury switch and the second mercury switch are configured to be positioned within the tailgate of the vehicle.

3. The camera system of claim 2, wherein the first mercury switch and the second mercury switch are positioned in opposing directions such that activation of the first mercury switch occurs when the second mercury switch is inactive, and vice versa.

4. The camera system of claim 1, wherein activation of the first mercury switch allows imaging from the rear camera to be conveyed to an inner display of the vehicle.

5. The camera system of claim 4, wherein activation of the second mercury switch allows imaging from the alternate camera to be conveyed to the inner display of the vehicle.

6. The camera system of claim 5, wherein the first mercury switch and the second mercury switch are positioned at an angle of about 45 degrees relative to a ground beneath the vehicle.

7. The camera system of claim 6, wherein imaging from only the rear camera or the alternate camera is conveyed to the inner display of the vehicle at one time.

8. The camera system of claim 1, wherein the rear camera and the alternate camera each have an independent and dedicated external power source.

9. The camera system of claim 8, wherein a power wire extending from the rear camera is received by an input of the first mercury switch and a power wire extending from the alternate camera is received by an input of the second mercury switch.

10. The camera system of claim 9, wherein an output power wire of the first mercury switch is connected to an output power wire of the second mercury switch at the common wire connection point to create a shared, single output power wire of the common wire connection point.

11. The camera system of claim 10, wherein video wiring of the rear camera, video wiring of the alternate camera, and the single output power wire converge into a wire harness of the camera system.

12. The camera system of claim 11, wherein the wire harness is adapted to connect the video wiring of the rear camera, the video wiring of the alternate camera, and the single output power wire to a main connector.

13. The camera system of claim 12, wherein the main connector is connected to a vehicle connection point to integrate the camera system with an overallthe vehicle system.

14. The camera system of claim 1, wherein the camera system is adapted for installation in an original equipment manufacturer (OEM) vehicle.

15. A camera system configured for installation into a vehicle, comprising:
   (a) an alternate camera configured to be secured along a top edge of a tailgate of a vehicle or a rear bumper of the vehicle; and
   (b) a tilt switch configured to be coupled to the tailgate of the vehicle to determine a position of the tailgate, wherein when the tailgate is in an open position, the tilt switch is configured to signal the camera system to activate the alternate camera and deactivate a rear camera of the vehicle located on the tailgate of the vehicle,
   wherein the tilt switch includes a first mercury switch configured to be in electrical communication with the rear camera and a second mercury switch in electrical communication with the alternate camera, and
   wherein wiring of the first mercury switch converges with wiring of the second mercury switch at a common wire connection point that is configured to electrically connect the camera system to an electrical system of the vehicle.

16. The camera system of claim 15, wherein the camera system is configured to be connected to existing wiring of the rear camera of the vehicle via the wiring of the first mercury switch.

17. The camera system of claim 15, wherein the wiring of the first mercury switch includes a first output power wire and the wiring of the second mercury switch includes a second output power wire, and wherein the first output power wire and the second output power wire are connected at the common wire connection point to create a single output power wire of the common wire connection point.

18. The camera system of claim 17, wherein the single output power wire of the common wire connection point is configured to power both the rear camera and the alternate camera.

19. A camera system for a vehicle, comprising:
- a rear camera configured to be secured to an outer surface of a tailgate of the vehicle to provide imaging of a rear area behind the vehicle when the tailgate is in a closed position;
- an alternate camera configured to be secured to the vehicle to provide imaging of the rear area of the vehicle when the tailgate is in an open position; and
- a tilt switch configured to determine a position of the tailgate and signal to activate the rear camera or the alternate camera based on the position of the tailgate, wherein the tilt switch includes:
  - a first mercury switch in electrical communication with the rear camera, and
  - a second mercury switch in electrical communication with the alternate camera, wherein the first mercury switch and the second mercury switch are configured to be positioned within the tailgate of the vehicle, and
- wherein an output power wire of the first mercury switch is connected to an output power wire of the second mercury switch at a common wire connection point, thereby allowing for a shared, single output power wire of the common wire connection point.

20. The camera system of claim 19, wherein activation of the first mercury switch allows imaging from the rear camera to be conveyed to an inner display of the vehicle and activation of the second mercury switch allows imaging from the alternate camera to be conveyed to the inner display of the vehicle.

\* \* \* \* \*